US008495737B2

(12) United States Patent
Sinha et al.

(10) Patent No.: US 8,495,737 B2
(45) Date of Patent: Jul. 23, 2013

(54) SYSTEMS AND METHODS FOR DETECTING EMAIL SPAM AND VARIANTS THEREOF

(75) Inventors: Amit Sinha, San Jose, CA (US); Robert Louis Voit, Milpitas, CA (US); Kailash Kailash, San Jose, CA (US); Jose Raphel, Austin, TX (US)

(73) Assignee: Zscaler, Inc., San Jose, CA (US)

( * ) Notice: Subject to any disclaimer, the term of this patent is extended or adjusted under 35 U.S.C. 154(b) by 190 days.

(21) Appl. No.: 13/038,144

(22) Filed: Mar. 1, 2011

(65) Prior Publication Data

US 2012/0227104 A1 Sep. 6, 2012

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .......................................................... 726/22

(58) Field of Classification Search
USPC .......................................................... 709/22
See application file for complete search history.

(56) References Cited

U.S. PATENT DOCUMENTS

| | | | |
|---|---|---|---|
| 6,769,016 B2 | 7/2004 | Rothwell et al. | |
| 7,016,939 B1 | 3/2006 | Rothwell et al. | |
| 7,475,118 B2 | 1/2009 | Leiba et al. | |
| 7,574,409 B2 | 8/2009 | Patinkin | |
| 7,590,694 B2 | 9/2009 | Yu | |
| 7,644,127 B2 | 1/2010 | Yu | |
| 7,664,173 B2 | 2/2010 | Nakano | |
| 7,711,192 B1 | 5/2010 | Smirnov | |
| 8,112,484 B1 * | 2/2012 | Sharma et al. ................ | 709/206 |
| 2005/0060643 A1 | 3/2005 | Glass et al. | |
| 2006/0080303 A1 | 4/2006 | Sargent et al. | |
| 2006/0095966 A1 | 5/2006 | Park | |
| 2010/0005149 A1 | 1/2010 | Yu | |
| 2010/0082749 A1 | 4/2010 | Wei et al. | |
| 2010/0106677 A1 | 4/2010 | Yu | |
| 2010/0316300 A1 | 12/2010 | Epshtein et al. | |
| 2012/0016884 A1 * | 1/2012 | Rowney et al. ................ | 707/747 |

\* cited by examiner

*Primary Examiner* — Benjamin R Bruckart
*Assistant Examiner* — Normin Abedin
(74) *Attorney, Agent, or Firm* — Clements Bernard PLLC; Lawrence A. Baratta, Jr.; Christopher L. Bernard (57) ABSTRACT

The present disclosure provides systems and methods for detecting email spam and variants thereof. The systems and methods are configured to detect spam messages and variations thereof for different senders and with slight differences within the message body. In an exemplary embodiment, an incoming message body (m) is converted to a sequence of successive word lengths ($S_m$): m->$S_m$, a comparison is performed between the sequence, $S_m$, and a plurality of stored sequences ($S_k$) of known spam messages, and the incoming message is flagged as spam based on the comparison. Further, the plurality of stored sequences, $S_k$, may be continually updated based on user feedback and other spam detection techniques. The systems and methods of the present invention may be implemented through a computer, such as a mail server, through a cloud-based security system, through a user's computer via a software agent, and the like.

15 Claims, 7 Drawing Sheets

SYSTEMS AND METHODS FOR DETECTING EMAIL SPAM AND VARIANTS THEREOF

FIELD OF THE INVENTION

The present invention relates generally to computer security systems and methods. More particularly, the present invention relates to systems and methods for detecting email spam and variants thereof.

BACKGROUND OF THE INVENTION

Electronic mail (referred to as email) has changed the way people communicate. However, email is constantly being threatened by spam email which is unsolicited, junk, etc. Spam is used for a variety of purposes including product advertising, advance fee fraud scams, phishing, virus distribution, etc. According to various studies, upwards of 85% to 90% or more of email is spam. As such, users are turning to various spam detection and isolation techniques to separate spam email from legitimate email. Conventional spam detection methods largely rely on two broad techniques: Sender Reputation and Message Analysis. Sender reputation checks the reputation of the Internet Protocol (IP) address or the like of the sender and its past history. Ill reputed senders are ones that have sent large volumes of spam in the past. Sender reputation analysis may also check for consistency in the sender's domain and IP address in the Domain Name System (DNS) records. Sender IP reputation analysis had been a very effective tool in countering spam in the past. Message reputation looks for keywords (e.g. "free Viagra") and other patterns in the message body to classify an email as spam. Disadvantageously, spammers are getting sophisticated. For example, they are able to leverage large groups of botnets and infected computers worldwide to send spam. Also, more and more Internet Service Providers (ISPs) are now using Network Address Translation (NAT), where the internal IP address of its subscribers is private. Thus, IP reputation becomes less effective in these scenarios. Spammers are also able to vary messages slightly and send few spam emails from many machines worldwide as opposed to sending bulk mails from one server. This has decreased the effectiveness of traditional spam detection methods.

BRIEF SUMMARY OF THE INVENTION

In an exemplary embodiment, a computer-implemented spam detection method includes receiving an electronic mail message, converting the electronic mail message into a sequence, comparing the sequence with a plurality of sequences stored in a spam table, and determining if the electronic mail message is spam responsive to the comparing step. The comparing step may include determining an edit distance for the sequence to each of the plurality of sequences, and the edit distance may be a Levenshtein Distance. The sequence may include a series of word lengths representing a number of characters in each word of the email message. The word lengths may be determined based on delimiters including any of whitespaces, linefeeds, tabs, etc. The computer-implemented spam detection method may further include determining the email message is not spam responsive to the comparing step, receiving an indication of spam related to the email message, and adding the sequence to the plurality of sequences in the spam table. The indication of spam may be based on any of flagging as spam by a user, sender reputation analysis, and message analysis including keywords, rule-based filtering, and statistical content filtering. The computer-implemented spam detection method may further include creating an initial spam table including the plurality of sequences and an aging factor associated with each of the plurality of sequences, if the sequence is within a threshold of an edit distance of one of the plurality of sequences, resetting the aging factor for the one of the plurality of sequences, and periodically removing aged sequences in the plurality of sequences based on the aging factor. The computer-implemented spam detection method may further include receiving updates for the spam table based upon remote spam detections. The computer-implemented spam detection method may further include determining a size of the sequence, and limiting the comparing step to sequences in the spam table within a size ranged of the size of the sequence.

In another exemplary embodiment, a spam detection system includes a data store, a network interface communicatively coupled to a network, a processor, wherein the data store, the network interface, and the processor are communicatively coupled therebetween, and wherein the processor is configured to: convert an email message body to a sequence of successive word lengths, compute an edit distance between the sequence and each of a plurality of known spam sequences, and flag the email message as spam based upon one of the edit distances being within a threshold. The spam detection system may include an email server communicatively coupled to a plurality of users and receiving email messages therefor. The sequence may include a series of word lengths representing a number of characters in each word of the email message, and wherein the word lengths are determined based on delimiters including any of whitespaces, linefeeds, tabs, etc. The processor may be configured to determine the email message is not spam responsive to the comparing step, receive an indication of spam related to the email message, and add the sequence of successive word lengths to the plurality of known spam sequences. The processor may also be configured to receive or create an initial spam table including the plurality of known spam sequences and an aging factor associated with each of the plurality of known spam sequences, if the sequence of successive word lengths is within a threshold of an edit distance of one of the plurality of sequences, reset the aging factor for the one of the plurality of known spam sequences, and periodically remove aged sequences in the plurality of known spam sequences based on the aging factor. The processor may further be configured to receive updates for the plurality of known spam sequences based upon remote spam detections, and provide updates for the plurality of known spam sequences based upon local spam detections.

In yet another exemplary embodiment, a network security system includes a processing node communicatively coupled to a user and to an external network, wherein the processing node comprises a data store storing security policy data for the user, data inspection engines configured to perform threat detection classification on content to the user from the external network, and a manager communicatively coupled to the data store and the data inspection engines; and an authority node communicatively coupled to the processing node, wherein the authority node includes a data store storing security policy data including a spam table; wherein the processing node and the authority node are configured to detect email spam and update the spam table based thereon. The processing node may be configured to monitor email messages from the user and a plurality of users, implement a spam detection algorithm on the monitored email messages, and periodically communicate to the authority node for updates related to the spam table. The spam detection algorithm may include converting each of the monitored email messages into a sequence of successive word lengths, comparing the sequence of successive word lengths with sequences in the spam table, and determining if each of the monitored email messages is spam responsive to the comparing step. The spam detection algorithm may be configured to provide continual updates between the processing node and the authority node.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention relates to systems and methods for detecting email spam and variants thereof. The systems and methods are configured to detect spam messages and variations thereof for different senders and with differences within the message body. In an exemplary embodiment, an incoming message body (m) is converted to a sequence of successive word lengths ($S_m$): m->$S_m$, a comparison is performed between the sequence, $S_m$, and a plurality of stored sequences ($S_k$) of known spam messages, and the incoming message is flagged as spam based on the comparison. Further, the plurality of stored sequences, $S_k$, may be continually updated based on users flagging or unflagging messages as spam. By converting the message into the sequence of word lengths, $S_m$, substitutions and minor edits (e.g. changing a Uniform Resource Locator (URL), name, HyperText Markup Language (HTML) tag, etc.) are effectively addressed. Techniques that rely on exact matches or use hashes or winnowing techniques often get circumvented by simple edits. The systems and methods of the present invention may be implemented through a computer, such as a mail server, through a cloud-based security system, through a user's computer via a software agent, and the like.

Figure 1:
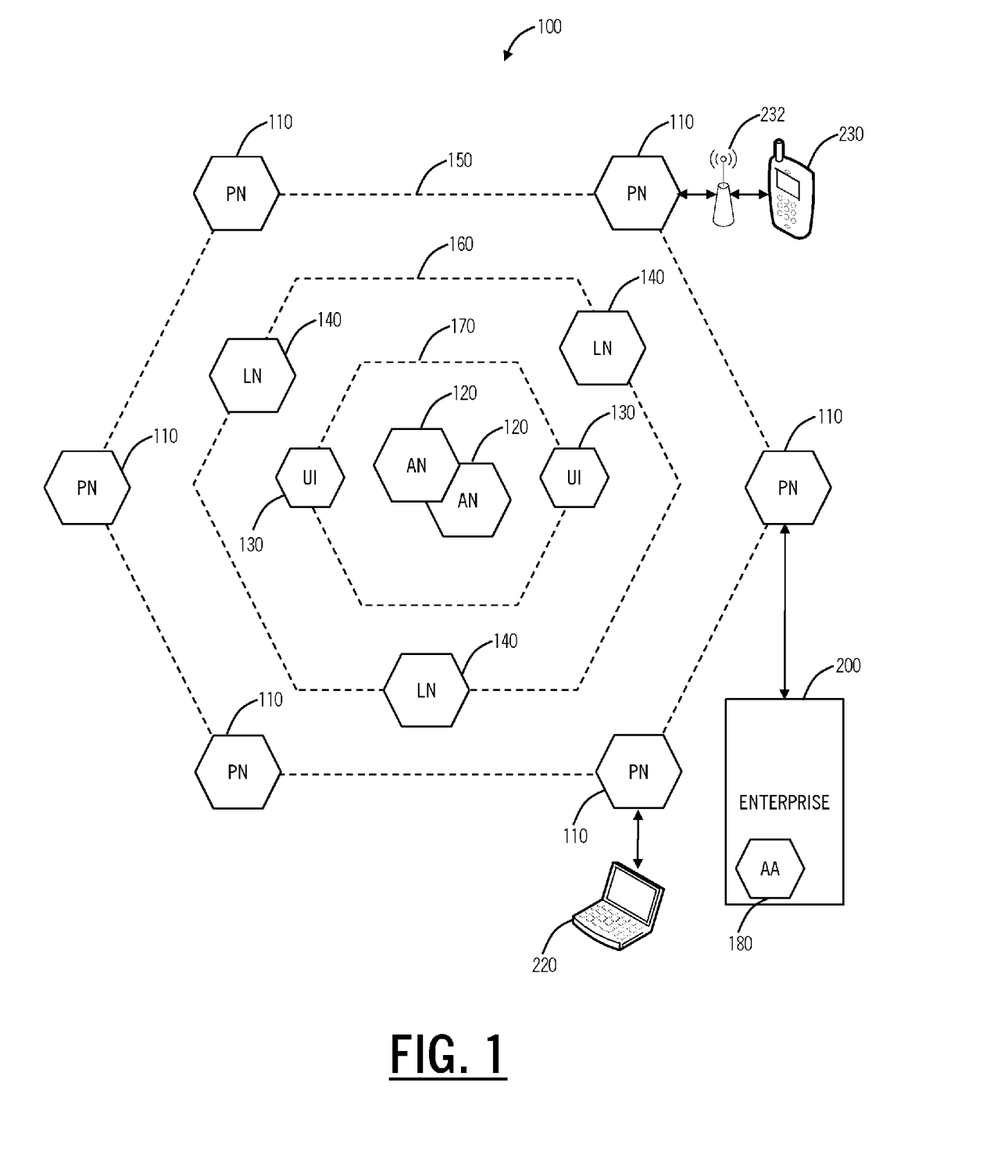
FIG. 1 is a block diagram of a distributed security system which may be utilized for detecting spam and variants thereof of the present invention.

Referring to FIG. 1, in an exemplary embodiment, a block diagram illustrates of a distributed security system 100. The system 100 may, for example, be implemented as an overlay network in a wide area network (WAN), such as the Internet, a local area network (LAN), or the like. The system 100 includes content processing nodes, PN 110, that proactively detect and preclude the distribution of security threats, e.g., malware, spyware, viruses, email spam, etc., and other undesirable content sent from or requested by an external system. Example external systems can include an enterprise 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector D=[d1, d2, ..., dn] for a content item of one or more parts C=[c1, c2, ..., cm]. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part C=[c1, c2, ..., cm] of the content item, at any of the processing nodes 110, any one of the data inspection engines generates an output that results in a classification of "violating."

Figure 3:
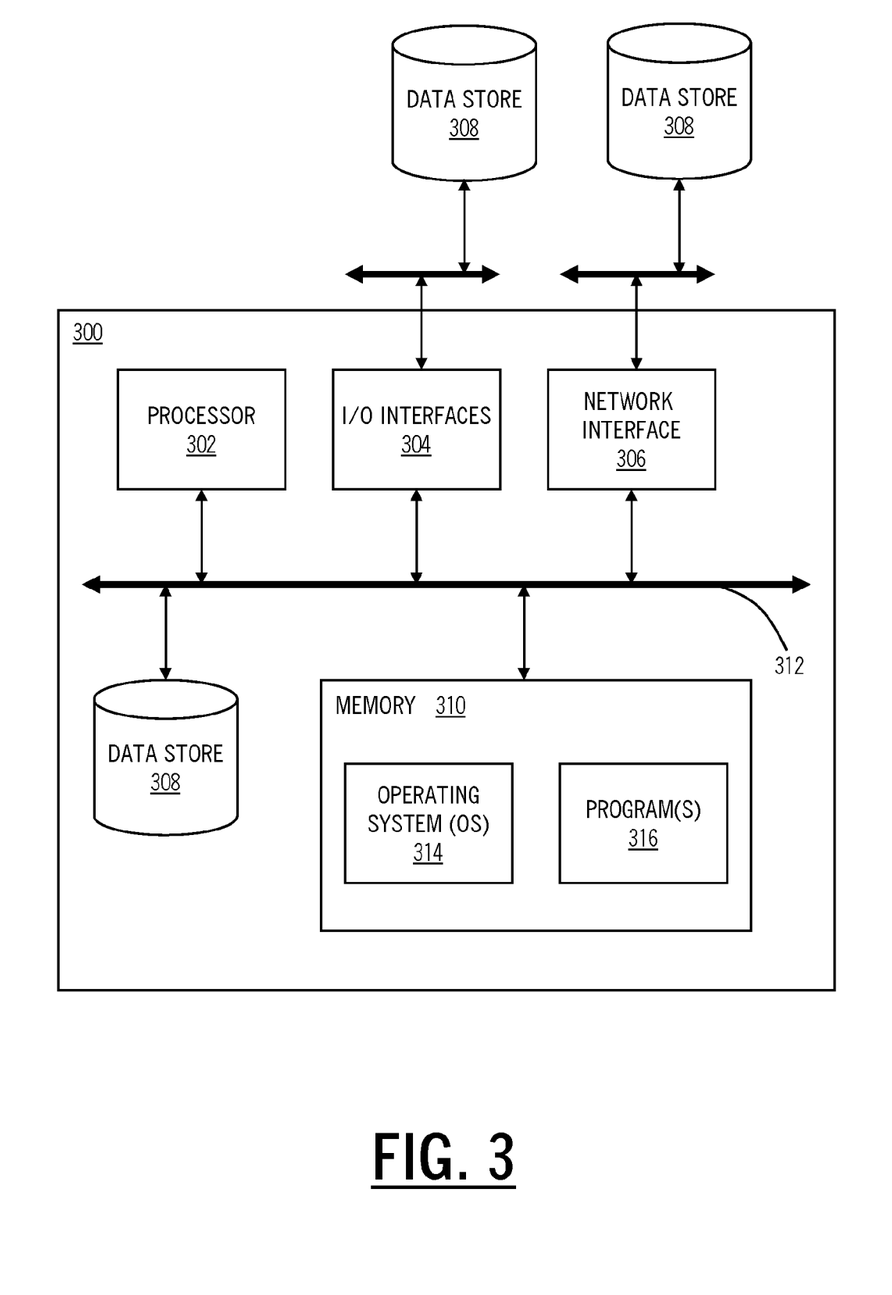
FIG. 3 is a block diagram of a server which may be used in the distributed security system of FIG. 1 or standalone for detecting spam and variants thereof.

Each of the processing nodes 110 may be implemented by one or more of computer and communication devices, e.g., server computers, gateways, switches, etc, such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc may be configured to establish communications through the nearest (in traffic communication time) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may can, for example, define security policies for a protected system, e.g., security policies for the enterprise 200. Example policy data may define access privileges for users, web sites and/or content that is disallowed, restricted domains, etc. The authority nodes 120 may distribute the policy data to the access nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 110 may serve as an application layer 160. The application layer 160 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other IP security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise the access agent 180 may be configured to perform MPLS labeling. In another transparent proxy mode exemplary embodiment, a protected system, such as the enterprise 200, may identify the processing node 110 as a next hop router for communication with the external servers.

Figure 2:
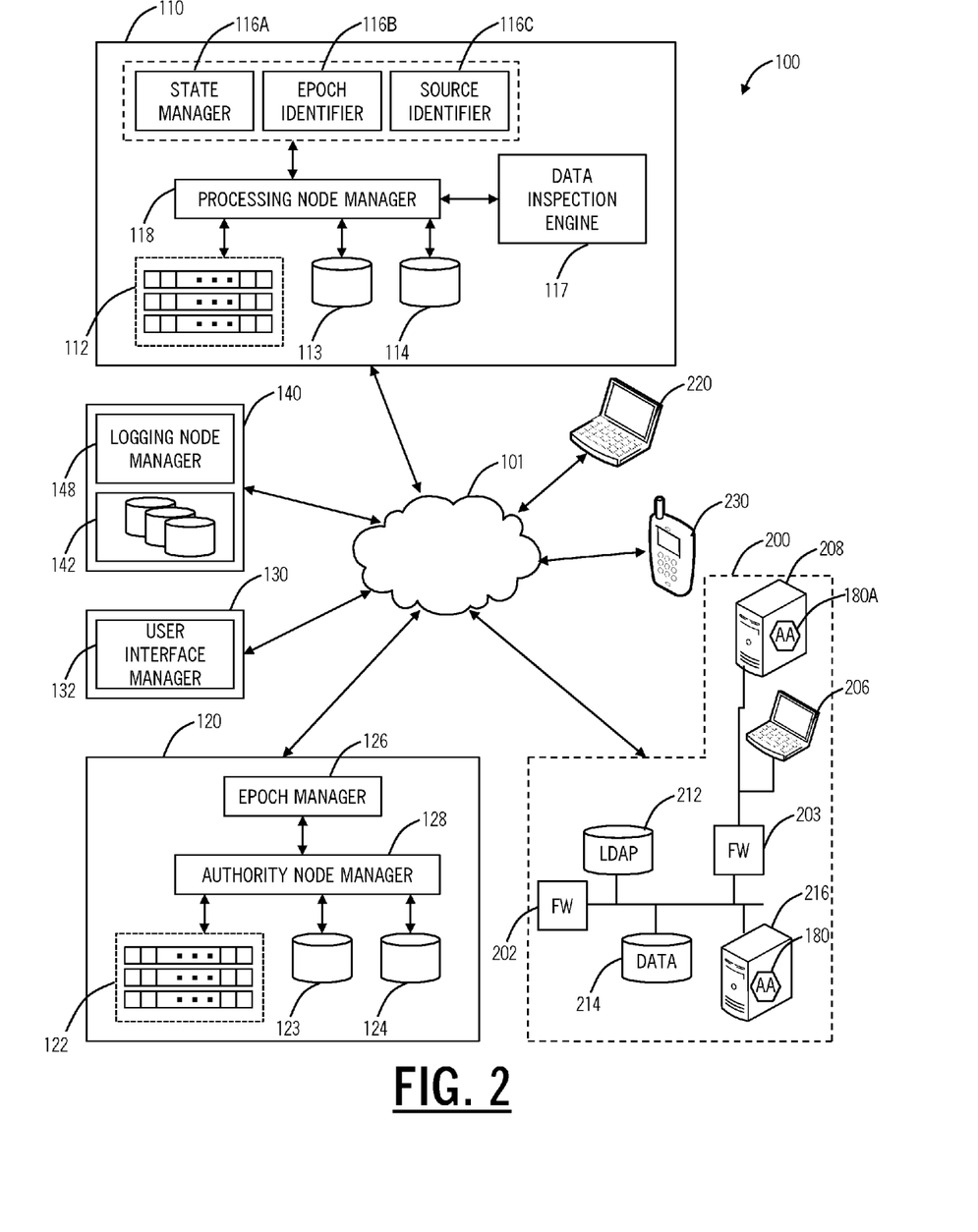
FIG. 2 is a block diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 cmay, for example, include a firewall (FW) 202 protecting an internal network that may include one or more enterprise servers 216, a lightweight director access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include a user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180a may be included on a client computer 208. The client access agent 180a may, for example, facilitate security processing by providing a hash index of files on the user computer 208 to a processing node 110 for malware, virus detection, etc. Other security operations may also be facilitated by the access agent 180a. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the server 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

In an exemplary embodiment, the processing nodes 110 are external to network edges of the external systems 200, 220 and 230. Each of the processing nodes 110 stores security policies 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to further validate the authenticity of authentication data. The processing node 110 may further include a source processor 116C. The source processor 116C may be used to verify the source of authorization and authentication data. The source processor 116C may identify improperly obtained authorization and authentication data, enhancing the security of the network.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the URL address of a URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 110.

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 112 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a computer readable medium. Other processing architectures can also be used, e.g., a combination of specially designed hardware and software, for example.

Referring to FIG. 3, in an exemplary embodiment, a block diagram illustrates a server 300 which may be used in the system 100 or standalone in performing email spam detection and variants thereof. Any of the processing nodes 110, the authority nodes 120, and the logging nodes 140 may be formed through one or more servers 300. Further, the computer device 220, the mobile device 230, the servers 208, 216, etc. may include the server 300. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 can include, for example, a serial port, a parallel port, a small computer system interface (SCSI), an infrared (IR) interface, a radio frequency (RF) interface, and/or a universal serial bus (USB) interface.

The network interface 306 may be used to enable the server 300 to communicate on a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The operating system 314 may be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), Android and variants thereof (available from Google, Inc. of Mountain View, Calif.), or the like. The one or more programs 316 may be configured to implement the various processes, algorithms, methods, techniques, etc. described herein.

Figure 4:
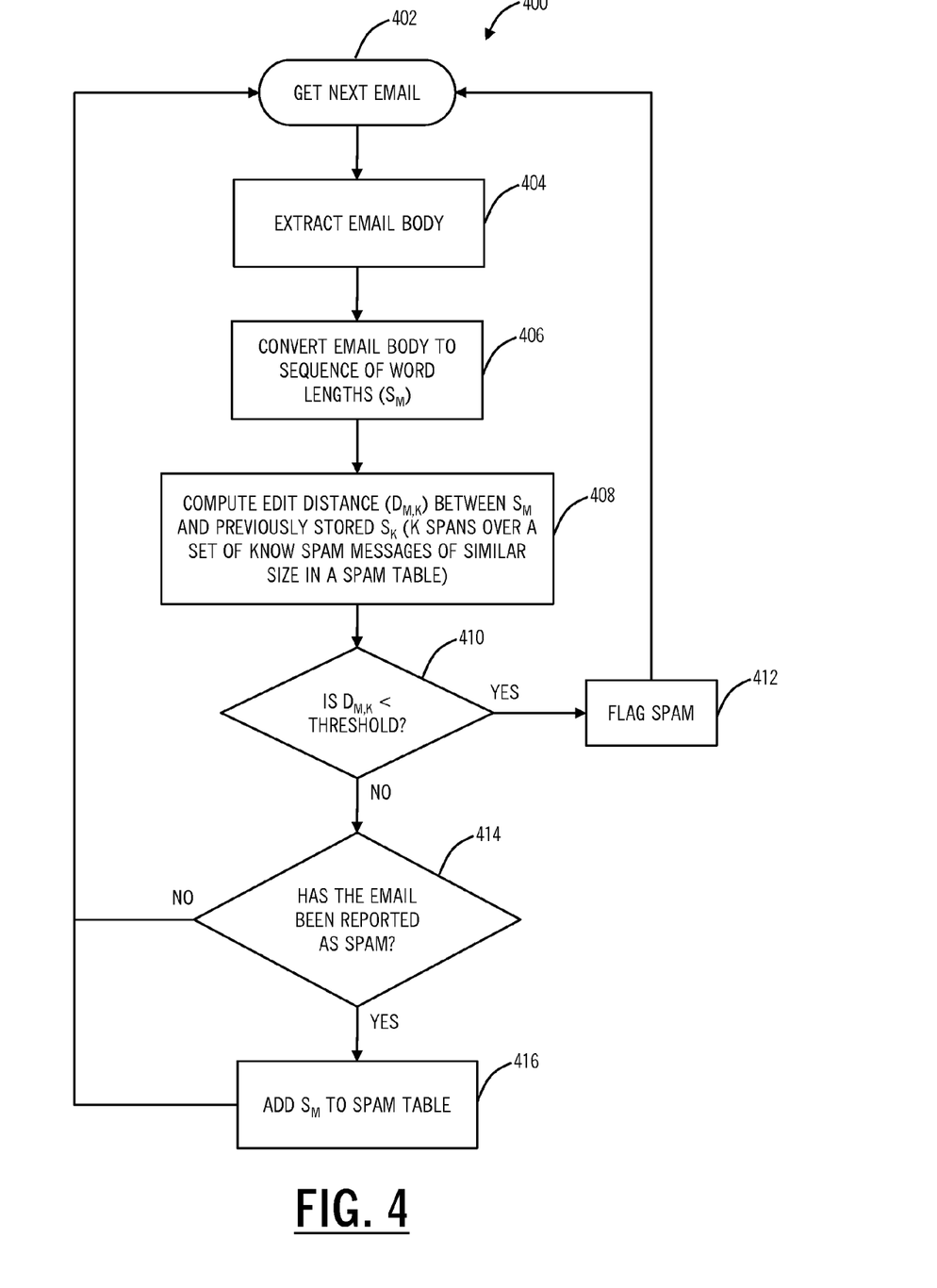
FIG. 4 is a flow chart of a spam detection method configured to identify spam email and variants thereof.

Referring to FIG. 4, in an exemplary embodiment, a flow chart illustrates a spam detection method 400 configured to identify spam email and variants thereof. Specifically, the spam detection method 400 analyzes email contents thereby enabling spam detection between different senders, message headers, etc. and with slightly varied message contents. In an exemplary embodiment, the spam detection method 400 may be implemented on the server 300. In another exemplary embodiment, the spam detection method 400 may be implemented through the distributed security system 100. The spam detection method 400 retrieves an email message (step 402). The spam detection method 400 extracts the email body from the email message (step 404). Here, the spam detection method 400 extracts the main part of an email message containing the actual, arbitrary data such as text as opposed to the header, which contains control and meta-information. The email body, m, is then converted into a sequence of successive word lengths, $S_m$ (step 406). For example, an email body of "Hi my name is Larry" would be converted to $S_m=[2\ 2\ 4\ 2\ 5]$. Word lengths may be computed using one or more delimiters such as whitespaces, linefeeds, tabs, etc. Also, word lengths may include commas, periods, colons, or other punctuation marks, as well as other characters, i.e. underscores, etc.

The spam detection method 400 includes a spam table of successive word lengths, ST. The present invention compares sequence generated from message m, $S_m$, to a subset of known spam sequences stored in table ST, any one of which is represented by $S_k$. The sequence of successive word lengths, $S_m$, is then compared to previously stored successive word lengths, $S_k$ (k spans over the set of know spam messages, stored in some table, that have similar size or number of words as $S_m$), in the spam table ST (step 408). Specifically, the spam detection method 400 may compute an edit distance or some other metric based on the comparison of $S_m$ to various $S_k$. For example, the spam detection method 400 may compute a Levenshtein Distance, $D_{m,k}$, between $S_m$ and previously stored $S_k$. Levenshtein distance is an exemplary metric for measuring the amount of difference between two sequences (i.e. an edit distance). The edit distance between two strings of characters is the number of operations required to transform one of them into the other. There are several different ways to define an edit distance, depending on which edit operations are allowed: replace, delete, insert, transpose, and so on. For example, the Levenshtein distance between "kitten" and "sitting" is three, since three edits change one into the other, and there is no way to do it with fewer than three edits. Other distance algorithms may also be used including, but not limited to, Damerau-Levenshtein distance, Euclidean distance, Hunt-McIlroy algorithm, Jaccard index, Jaro-Winkler distance, Needleman-Wunsch algorithm, Wagner-Fischer edit distance, Hirschberg's algorithm, Sørensen similarity index, etc. By converting the message into a sequence of word lengths, substitutions and minor edits (e.g. changing a URL, name, HTML tag, etc.) are effectively addressed. Techniques that rely on exact matches or use hashes or winnowing techniques often get circumvented by simple edits.

If any of the computed distances, $D_{m,k}$, are less than a threshold (step 410), the spam detection method 400 flags the email as spam (step 412) and may return to analyze a next email (step 402). If none of the computed distances, $D_{m,k}$, is less than the threshold (step 410), the spam detection method 400 determines if the email is reported as spam via other techniques (step 414). If not, the spam detection method 400 may return to analyze a next email (step 402). If so, the spam detection method 400 may add the sequence $S_m$ to the spam table (step 416), and the spam detection method 400 may return to analyze a next email (step 402). Note, the other techniques may include, for example, flagging as spam by a user, sender reputation analysis, message analysis such as via keywords, rule-based filtering, statistical content filtering, etc. In this manner, the spam detection method 400 may adaptively update the spam table. In essence the spam detection method 400 learns about spam patterns through feedback, and flags new spam messages based on their resemblance to known spam mails.

The spam detection method 400 utilizes the edit distance to compare $S_m$ with previously stored $S_k$ to determine $D_{m,k}$. Based on $D_{m,k}$, the spam detection method 400 may determine whether or not to classify the email message as spam. For example, the spam detection method 400 may use the Levenshtein Distance algorithm to compute the edit distance on the word length sequences. The term edit distance is often used to refer specifically to Levenshtein distance. In an exemplary embodiment, the edit distance is computed based on a number of inserts/deletions required to convert $S_m$ to one of the previously stored $S_k$. This comparison is quick and efficient since the comparison only looks at the word length sequences, as opposed to actual characters. For example, assume two messages are as follows:

1. Hi Joe Check this Out—$S_m$=[2 3 5 4 3]
2. Hi Art Check this Out—$S_k$=[2 3 5 4 3]

The corresponding edit distance would be $D_{m,k}$=0. Alternatively, assume two messages are as follows:

1. Hi there Joe Check this Out—$S_m$=[2 5 3 5 4 3]
2. Hi Art Check this Out—$S_k$=[2 3 5 4 3]

The corresponding edit distance would be $D_{m,k}$=1 meaning one insert/deletion of a word or words is needed in the sequences to achieve equivalence in terms of the sequence word counts.

The present invention contemplates a variety of comparison methods between $S_m$ and $S_k$ and their associated sequences, word counts, and word lengths. Furthermore, the present invention also contemplates comparing characters between an email and a plurality of stored known spam emails in lieu of converting the email to a sequence of word lengths. Such a technique would require additional computing power, and would be implemented in a similar fashion as the spam detection method 400. Here, the spam table would include actual known spam email sequences, and the comparison would compare sequence by sequence to compute the edit distance and then classify as spam based on the threshold comparison.

Figure 5:
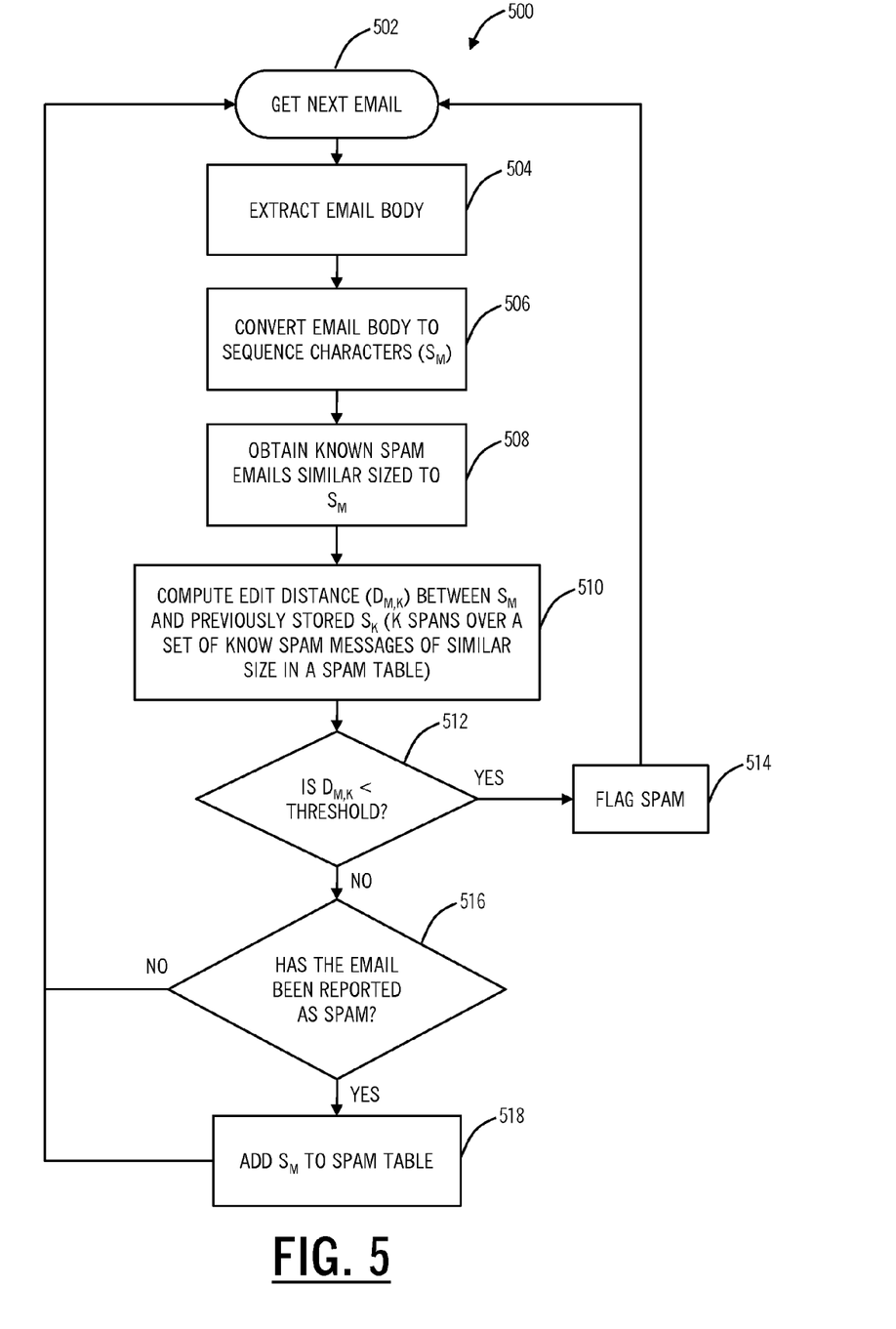
FIG. 5 is a flow chart of another spam detection method configured to identify spam email and variants thereof.

Referring to FIG. 5, in an exemplary embodiment, a flow chart illustrates a spam detection method 500 configured to identify spam email and variants thereof. Similar to the spam detection method 400, the spam detection method 500 analyzes email contents thereby enabling spam detection between different senders, message headers, etc. and with slightly varied message contents. In an exemplary embodiment, the spam detection method 500 may be implemented on the server 300. In another exemplary embodiment, the spam detection method 500 may be implemented through the distributed security system 100. The spam detection method 500 retrieves an email message (step 502). The spam detection method 500 extracts the email body from the email message (step 504). Here, the spam detection method 500 extracts the main part of an email message containing the actual, arbitrary data such as text as opposed to the header, which contains control and meta-information. The email body, m, is then converted into a sequence of successive word lengths, $S_m$ (step 506). Word lengths may be computed using one or more delimiters such as whitespaces, linefeeds, tabs, etc. Also, word lengths may include commas, periods, colons, or other punctuation marks, as well as other characters, i.e. underscores, etc.

The spam detection method 500 may perform an actual character by character analysis as opposed to a word count, sequence count, etc. analysis as performed in the spam detection method 400. However, such a character by character analysis may be difficult in terms of computing power, time, efficiency, etc. The spam detection method 500 may utilize the sequence $S_m$ to narrow a subset in the spam table for actual comparison. For example, if an email message has 100 words, it is not likely a spam variant of a known spam message with 125 words. Thus, the email message with 100 words may only need to be compared to known spam messages within a certain threshold difference (+/–a predetermined amount of words).

With the narrowed subset of spams from the table ST, any one of which is represented by $S_k$, the spam detection method 500 computes an edit distance, $D_{m,k}$, between $S_m$ and the previously stored $S_k$ on a character by character basis (step 510). If any of the computed distances, $D_{m,k}$, are less than a threshold (step 512), the spam detection method 500 flags the email as spam (step 514) and may return to analyze a next email (step 502). If none of the computed distances, $D_{m,k}$, is less than the threshold (step 512), the spam detection method 500 determines if the email is reported as spam via another technique (step 516). If not, the spam detection method 500 may return to analyze a next email (step 502). If so, the spam detection method 500 may add the sequence $S_m$ to the spam table (step 518), and the spam detection method 500 may return to analyze a next email (step 502). Note, the other techniques may include, for example, flagging as spam by a user, sender reputation analysis, message analysis such as via keywords, rule-based filtering, statistical content filtering, etc. In this manner, the spam detection method 500 may adaptively update the spam table. In essence the spam detection method 500 learns about spam patterns through feedback.

Figure 6:
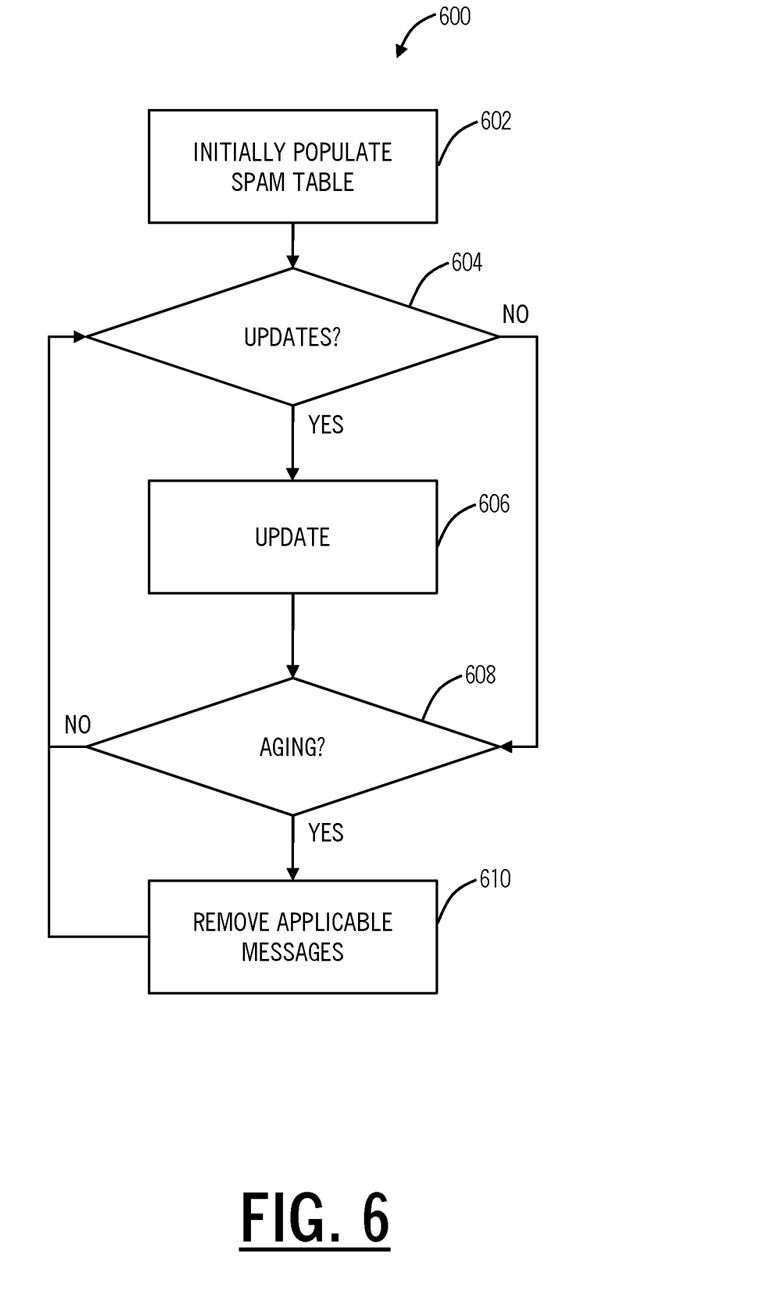
FIG. 6 is a flow chart of a spam table management method configured to manage a spam table of known spam emails.

Referring to FIG. 6, in an exemplary embodiment, a flow chart illustrates a spam table management method 600 configured to manage a spam table of known spam emails. The spam table may be stored on the data store 308 or equivalent in the server 300, in the distributed security system 100, etc. and managed accordingly. In particular, the spam table management method 600 provides a method for managing contents of the spam table that may be used with the spam detection method 400, the spam detection method 500, etc. Specifically, the spam table size can be managed by aging out patterns that do not match new mails over a period of time. Also, in addition to the world length sequence, the spam table can also store size and total word count to limit the number of sequences that need to be compared for every incoming email. The spam table management method 600 begins with an initially populated spam table (step 602). The spam table includes all required information needed to compare messages and also may include an aging factor for each entry in the table. The aging factor may be used to remove out patterns and messages which do not match new messages over a period of time.

The spam table management method 600 may continually or periodically update the spam table (step 604). Updates may come in a variety of forms including adding new entries based on receiving feedback, noting that a particular entry matched an email message, etc. For example, the spam detection method 400, the spam detection method 500, etc. may flag a specific entry in the spam table thereby resetting the aging factor when there is a detected match. If there are updates, the spam table management method 600 may perform the applicable updates (step 606). Periodically, continually, etc., the spam table management method 600 may perform aging to remove outdated entries (step 608). Here, the spam table management method 600 may remove any entries where the aging factor has expired, for example (step 610).

Figure 7:
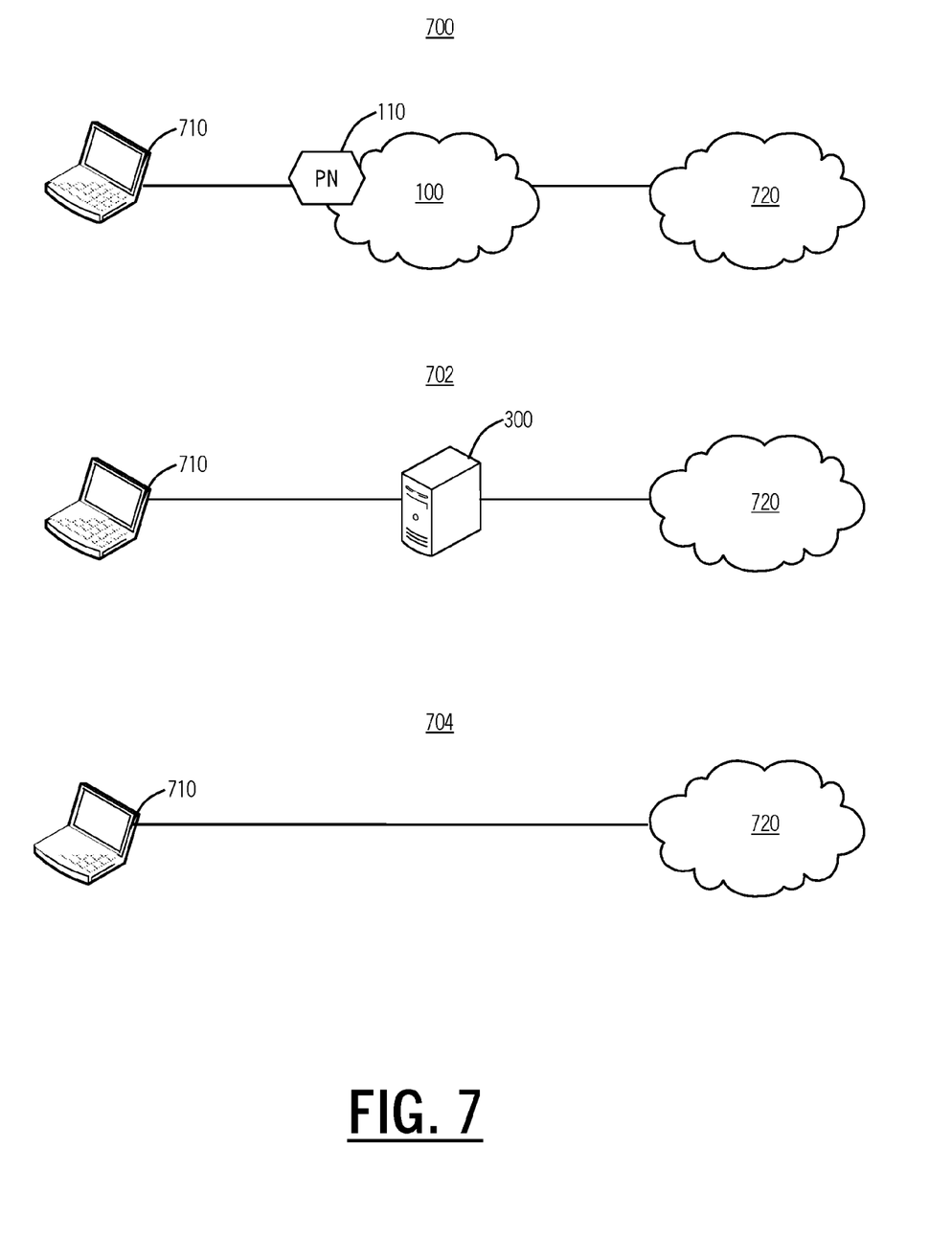
FIG. 7 is a network diagram of exemplary architectures between an end user or plural end users and the Internet using the spam detection.

Referring to FIG. 7, in exemplary embodiments, network diagrams illustrate network architectures 700, 702, 704 of exemplary architectures between an end user 710 (or plural end users 710) and the Internet 720 using the spam detection such as the spam detection method 400, the spam detection method 500, the spam table management method 600, etc. The network 700 includes the end user 710 connected to the Internet 720 via the distributed security system 100. For example, the end user 710 may connect via one of the processing nodes 110. In this exemplary embodiment, the system 100 may implement the spam detection as described herein and flag emails to the end user 710 based on the detection thereof. For example, spam detection and spam table management may be implemented by the processing nodes 110, the logging nodes 140, the authority nodes 150, or combinations thereof and a global database may include the spam table. Of note, the system 100 may utilize the processing nodes 110 to identify emails to update the spam table as well as classify incoming mails. Advantageously, the distributed security system 100 has a broad view of the users 710 and may manage a large spam table in real-time based on on-going detection of spam messages by the users 710.

The network 702 includes the end user 710 connected to the Internet 720 through a server 300, such as a mail server, DNS server, a firewall, a router/switch, etc. In an exemplary embodiment, the server 300 may be configured to implement the spam detection and to classify incoming emails to the user 710. Additionally, the server 300 may be in communication with other servers 300, computers, etc. for purposes of updating the spam table. For example, the spam table may be managed by a service provider that receives updates from various users through the server 300. The network 704 includes the end user 710 directly connected to the Internet 720. In this exemplary embodiment, the end user 710 may directly implement the spam detection in their email client. For example, the end user 710 may receive and transmit periodic updates from/to an external device to update the spam table.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A computer-implemented spam detection method, comprising:
   receiving an electronic mail message;
   converting the electronic mail message into a sequence;
   comparing the sequence with a plurality of sequences stored in a spam table;
   determining if the electronic mail message is spam responsive to the comparing step;
   determining the email message is not spam responsive to the comparing step, receiving an indication of spam related to the email message, and adding the sequence to the plurality of sequences in the spam table;
   creating an initial spam table comprising the plurality of sequences and an aging factor associated with each of the plurality of sequences;
   if the sequence is within a threshold of an edit distance of one of the plurality of sequences, resetting the aging factor for the one of the plurality of sequences; and
   periodically removing aged sequences in the plurality of sequences based on the aging factor.

2. The computer-implemented spam detection method of claim 1, wherein the comparing step comprises:
   determining an edit distance for the sequence to each of the plurality of sequences.

3. The computer-implemented spam detection method of claim 2, wherein the edit distance comprises a Levenshtein Distance.

4. The computer-implemented spam detection method of claim 3, wherein the sequence comprises a series of word lengths representing a number of characters in each word of the email message.

5. The computer-implemented spam detection method of claim 4, wherein the word lengths are determined based on delimiters comprising any of whitespaces, linefeeds, tabs, and other user specified delimiters.

6. The computer-implemented spam detection method of claim 1, wherein the indication of spam is based on any of flagging as spam by a user, sender reputation analysis, and message analysis comprising keywords, rule-based filtering, and statistical content filtering.

7. The computer-implemented spam detection method of claim 1, further comprising:
   receiving updates for the spam table based upon remote spam detections.

8. The computer-implemented spam detection method of claim 1, further comprising:
   determining a size of the sequence; and limiting the comparing step to sequences in the spam table within a size ranged of the size of the sequence.

9. A spam detection system, comprising:
   a data store;
   a network interface communicatively coupled to a network;
   a processor, wherein the data store, the network interface, and the processor are communicatively coupled therebetween, and wherein the processor is configured to:
   convert an email message body to a sequence of successive word lengths;
   compute an edit distance between the sequence and each of a plurality of known spam sequences; and
   flag the email message as spam based upon one of the edit distances being within a threshold;
   determine the email message is not spam responsive to the comparing step, receive an indication of spam related to the email message, and add the sequence of successive word lengths to the plurality of known spam sequences;
   receive or create an initial spam table comprising the plurality of known spam sequences and an aging factor associated with each of the plurality of known spam sequences;
   if the sequence of successive word lengths is within a threshold of an edit distance of one of the plurality of sequences, reset the aging factor for the one of the plurality of known spam sequences; and
   periodically remove aged sequences in the plurality of known spam sequences based on the aging factor.

10. The spam detection system of claim 9, wherein the spam detection system comprises an email server communicatively coupled to a plurality of users and receiving email messages therefor.

11. The spam detection system of claim 9, wherein the sequence comprises a series of word lengths representing a number of characters in each word of the email message, and wherein the word lengths are determined based on delimiters comprising any of whitespaces, linefeeds, tabs and other user specified delimiters.

12. The spam detection system of claim 9, wherein the processor is configured to:
   receive updates for the plurality of known spam sequences based upon remote spam detections; and
   provide updates for the plurality of known spam sequences based upon local spam detections.

13. A network security system, comprising:
   a processing node communicatively coupled to a user and to an external network, wherein the processing node comprises a data store storing security policy data for the user, data inspection engines configured to perform threat detection classification on content to the user from the external network, and a manager communicatively coupled to the data store and the data inspection engines; and
   an authority node communicatively coupled to the processing node, wherein the authority node comprises a data store storing security policy data comprising a spam table;
   wherein the processing node and the authority node are configured to detect email spam and update the spam table based thereon;
   wherein the processing node is configured to:
   receive an electronic mail message;
   convert the electronic mail message into a sequence;
   compare the sequence with a plurality of sequences stored in a spam table;
   determine if the electronic mail message is spam responsive to the compare step;
   determine the email message is not spam responsive to the comparing step, receive an indication of spam related to the email message, and add the sequence to the plurality of sequences in the spam table;
   receive an initial spam table comprising the plurality of sequences and an aging factor associated with each of the plurality of sequences from the authority node;
   if the sequence is within a threshold of an edit distance of one of the plurality of sequences, reset the aging factor for the one of the plurality of sequences; and
   periodically remove aged sequences in the plurality of sequences based on the aging factor.

14. The network security system of claim 13, wherein the spam detection algorithm comprises:
   converting each of the monitored email messages into a sequence of successive word lengths;
   comparing the sequence of successive word lengths with sequences in the spam table; and
   determining if each of the monitored email messages is spam responsive to the comparing step.

15. The network security system of claim 13, wherein the spam detection algorithm is configured to provide continual updates between the processing node and the authority node.

* * * * *